United States Patent
Weyerhaeuser et al.

(10) Patent No.: US 10,067,980 B2
(45) Date of Patent: Sep. 4, 2018

(54) DATABASE CALCULATION ENGINE INTEGRATING HIERARCHY VIEWS

(71) Applicant: SAP SE, Walldorf (DE)

(72) Inventors: Christoph Weyerhaeuser, Heidelberg (DE); Tobias Mindnich, Sulzbach (DE); Johannes Merx, Heidelberg (DE); Julian Schwing, Mannheim (DE); Daniel Patejdl, Karlsruhe (DE)

(73) Assignee: SAP SE, Walldorf (DE)

( * ) Notice: Subject to any disclaimer, the term of this patent is extended or adjusted under 35 U.S.C. 154(b) by 340 days.

(21) Appl. No.: 14/741,377

(22) Filed: Jun. 16, 2015

(65) Prior Publication Data

US 2016/0371330 A1 Dec. 22, 2016

(51) Int. Cl.
*G06F 17/30* (2006.01)

(52) U.S. Cl.
CPC .. *G06F 17/30466* (2013.01); *G06F 17/30451* (2013.01)

(58) Field of Classification Search
CPC .............. G06F 17/30466; G06F 17/30451
See application file for complete search history.

(56) References Cited

U.S. PATENT DOCUMENTS

| | | | | |
|---|---|---|---|---|
| 8,868,594 B2 * | 10/2014 | Baeumges | ........ | G06F 17/30463 707/718 |
| 2005/0065773 A1 * | 3/2005 | Huang | ................ | G06F 17/2735 704/7 |
| 2010/0145975 A1 * | 6/2010 | Ratiner | ............. | G06F 17/30637 707/765 |
| 2011/0258173 A1 * | 10/2011 | Ratiner | ............. | G06F 17/30637 707/706 |
| 2013/0262443 A1 * | 10/2013 | Leida | ................ | G06F 17/30427 707/722 |

FOREIGN PATENT DOCUMENTS

EP 2447858 A1 * 5/2012 ....... G06F 17/30463

* cited by examiner

*Primary Examiner* — Jared M Bibbee
(74) *Attorney, Agent, or Firm* — Mintz, Levin, Cohn, Ferris, Glovsky and Popeo, P.C.

(57) ABSTRACT

A calculation engine is described that executes calculation scenarios comprising a plurality of calculation nodes that specify operations to be performed to execute the query. One of the nodes can be a semantic node that is used to modify the query for operations requiring special handling including handling of hierarchy views. Related apparatus, systems, methods, and articles are also described.

22 Claims, 10 Drawing Sheets

DATABASE CALCULATION ENGINE INTEGRATING HIERARCHY VIEWS

TECHNICAL FIELD

The subject matter described herein relates to a database calculation engine that integrates hierarchy views by the use of calculation scenarios with semantic nodes that provide special handling operations for queries.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

Hierarchy views are often used in connection with reporting on analytic models. Hierarchy views, in this regard, refer to calculation models having nodes arranged in a hierarchical manner in which there certain nodes have more than one parent node. As such, front-end applications need to handle such hierarchies separately from the calculation models which can result in the consumption of greater processing resources while, at the same time, providing slower overall query execution time. Moreover, for calculation models supporting non-summable keyfigures, hierarchy integration outside of the calculation model can lead to unexpected results for such keyfigures.

SUMMARY

In one aspect, a query is received by a database server from a remote application server. The query is associated with a calculation scenario that defines a data flow model that includes a plurality of calculation nodes. Each calculation node defining one or more operations to execute on the database server and at least one of the nodes is a semantic node specifying an operation requiring special handling. At least one of the nodes being a leaf node having two or more parent nodes. Thereafter, the database server modifies the query using the semantic node to handle hierarchy views. In addition, the database server modifies the calculation scenario based on the modified query. The modified calculation scenario is then instantiated so that the database server can execute the operations defined by the calculation nodes of the modified calculation scenario to result in at least one result set. The at least one result set is then, at 160, provided by the database server to the application server.

A hierarchy specified by the semantic node can be used to aggregate data according to a selected hierarchy level. The received query can specify a unit conversion and operation and/or handling of count distinct keyfigures such that the special handling specified by the semantic node removes redundant operations.

At least a portion of paths and/or attributes defined by the calculation scenario can, in some cases, not be required to respond to the query. In such cases, the instantiated calculation scenario omits the paths and attributes defined by the calculation scenario that are not required to respond to the query.

At least one of the calculation nodes can filter results obtained from the database server. At least one of the calculation nodes can sort results obtained from the database server. The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool.

An input for each calculation node can include one or more of: a physical index, a join index, an OLAP index, and another calculation node. Each calculation node can have at least one output table that is used to generate the final result set. At least one calculation node can consume an output table of another calculation node.

In some variations, the query can be forwarded to a calculation node in the calculation scenario that is identified as a default node if the query does not specify a calculation node at which the query should be executed.

The calculation scenario can include database metadata. The calculation scenario can be exposed as a database calculation view. In such cases, a SQL processor can invoke the calculation engine to execute the calculation scenario behind the database calculation view. The calculation engine can invoke the SQL processor for executing set operations. The SQL processor can invoke the calculation engine when executing SQL queries with calculation views.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides a flexible, extendible, and powerful approach for special query handling. In particular, the current subject matter can be used to ensure that database applications are always provided with the correct result even if a special query-handling is required.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides integrated support for hierarchies inside semantic node of calculation models for execution by a database calculation engine. The semantic node within the calculation model as provided herein can hold all information (e.g. overview of key figures, unit conversion, etc.) in order to build a consistent query execution plan with hierarchy support.

Figure 1:
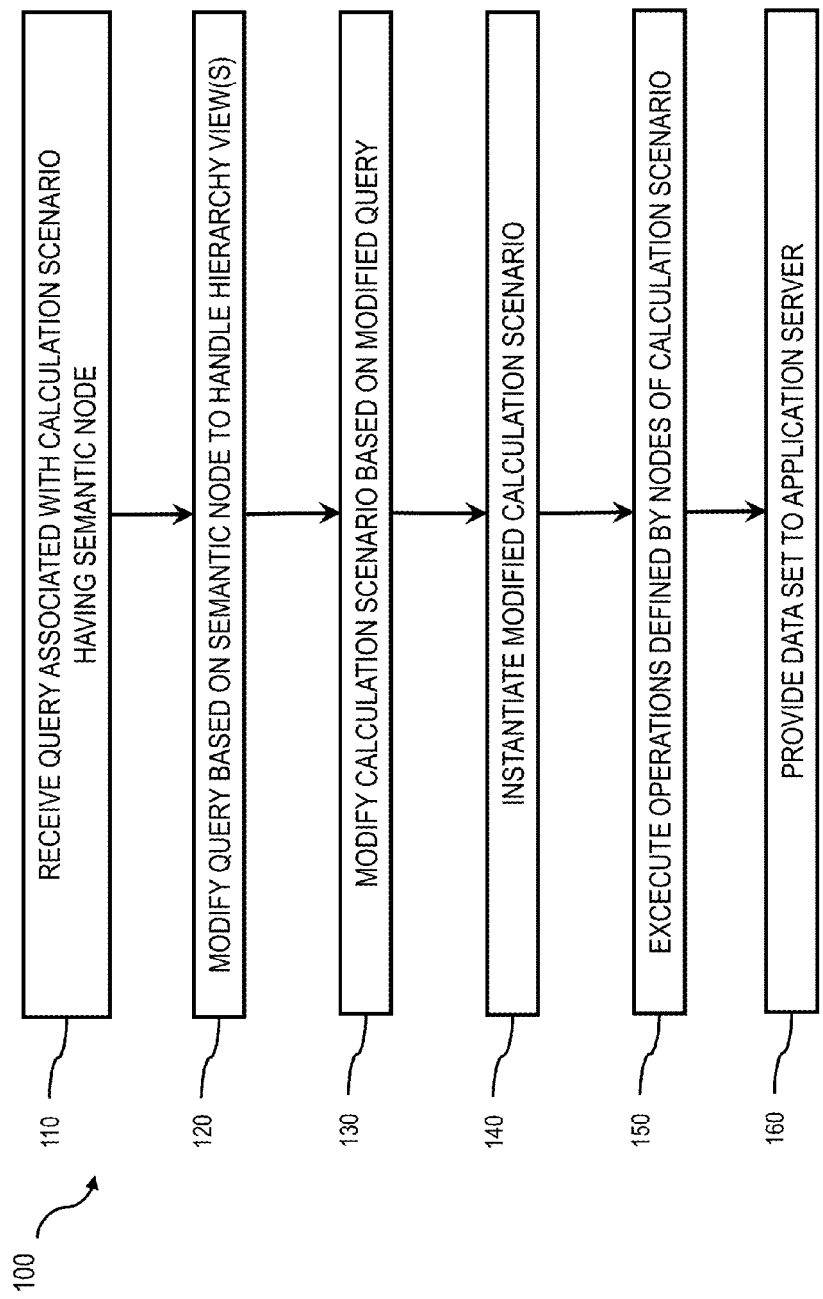
FIG. 1 is a process flow diagram illustrating a method of processing a query using a calculation scenario with a semantic node supporting hierarchical operations.

With reference to diagram 100 of FIG. 1, at 110, a query is received by a database server from a remote application server. The query is associated with a calculation scenario that defines a data flow model that includes a plurality of calculation nodes. Each calculation node defining one or more operations to execute on the database server and at least one of the nodes is a semantic node specifying an operation requiring special handling. At least one of the nodes being a leaf node having two or more parent nodes. Thereafter, at 120, the database server modifies the query using the semantic node to handle hierarchy views. In addition, at 130, the database server modifies the calculation scenario based on the modified query. The modified calculation scenario is, at 140, then instantiated so that, at 150, the database server can execute the operations defined by the calculation nodes of the modified calculation scenario to result in at least one result set. The at least one result set is then, at 160, provided by the database server to the application server.

The subject matter described herein can enable an application developer to define a data flow model to push down a high level algorithm to a database. A developer can define a calculation scenario which describes this algorithm in a general way as data flow consisting of calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

During query time (i.e., the time in which a database is queried), the data flow specified by a calculation scenario is instantiated. During instantiation, the calculation scenario is compacted to only include queries requirements by removing useless paths and attributes (that are not requested) within the calculation scenario. This compaction reduces calculation time and also minimizes the total amount of data that must be processed.

Figure 2:
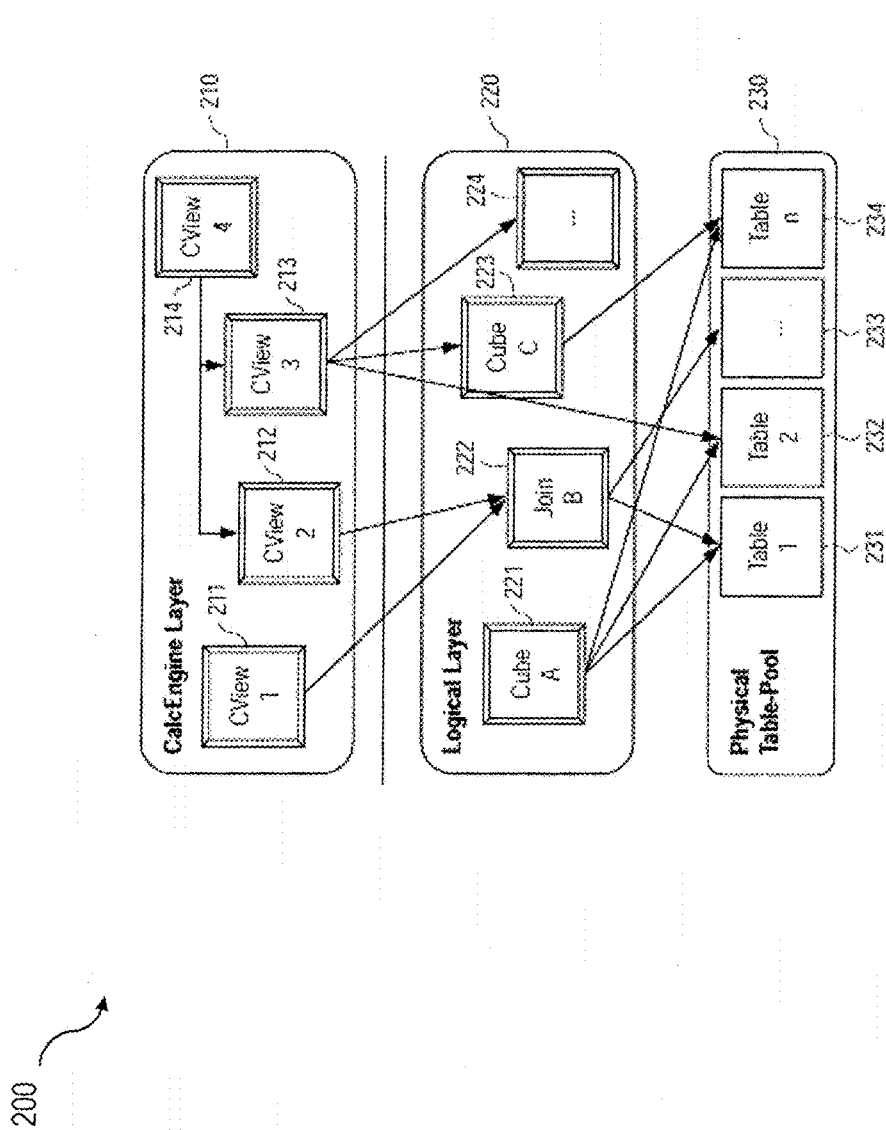
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes.

In calculation scenarios, two different representations can be provided. First, a pure calculation scenario in which all possible attributes are given. Second, an instantiated model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario.

Every calculation scenario can be uniquely identifiable by a name (i.e., the calculation scenario can be a database object with a unique identifier, etc.). This means, that the calculation scenario can be queried in a manner similar to a view in a SQL database. Thus, the query is forwarded to the calculation node 211-214 for the calculation scenario that is marked as the corresponding default node. In addition, a query can be executed on a particular calculation node 211-214 (as specified in the query). Furthermore, nested calculation scenarios can be generated in which one calculation scenario is used as source in another calculation scenario (via a calculation node 211-214 in this calculation scenario). Each calculation node 211-214 can have one or more output tables. One output table can be consumed by several calculation nodes 211-214.

Further details regarding calculation engine architecture and calculation scenarios can be found in U.S. Pat. No. 8,195,643 and U.S. Pat. App. Pub. No. 20140365464, the contents of both of which are hereby fully incorporated by reference.

Figure 3:
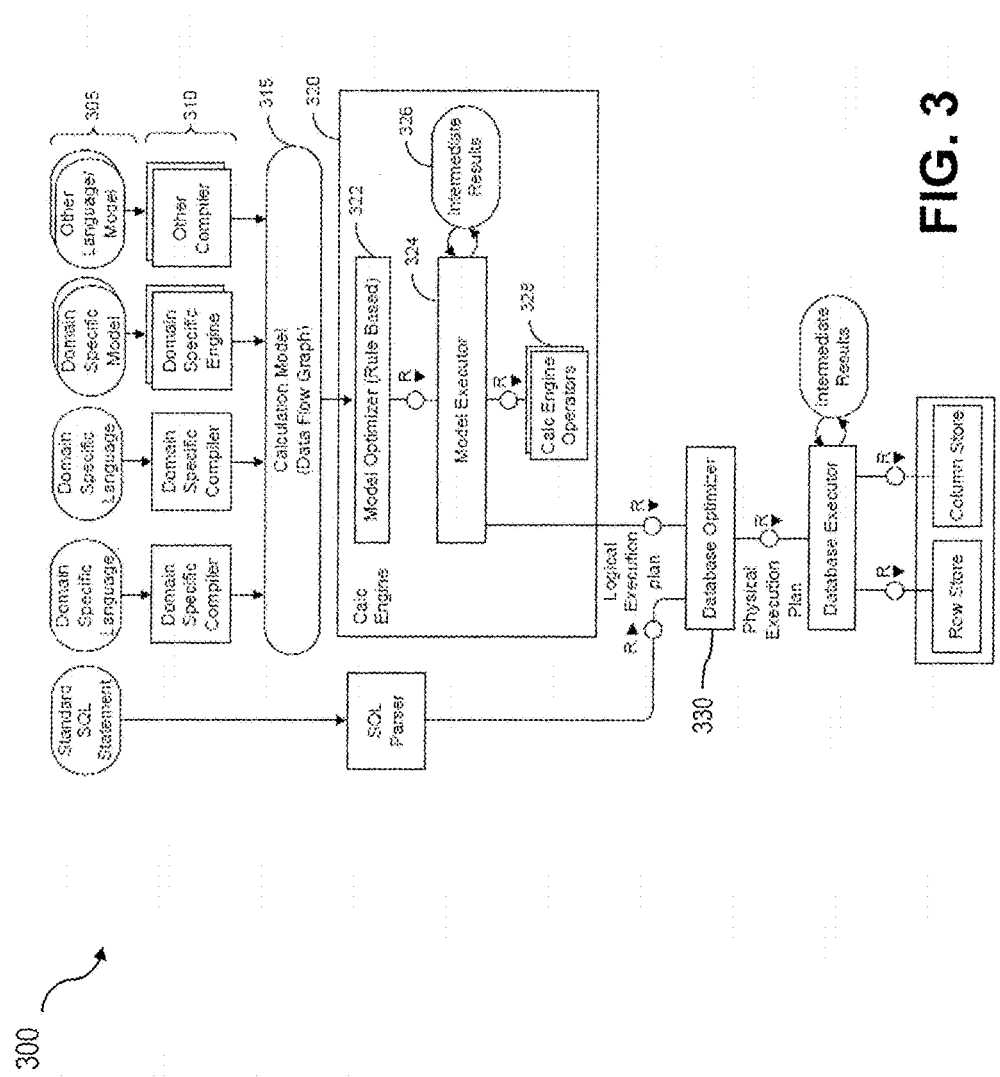
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

A calculation scenario 315 can be defined as part of database metadata and invoked multiple times. A calculation scenario 315 can be created, for example, by a SQL statement "CREATE CALCULATION SCENARIO <NAME> USING <XML or JSON>". Once a calculation scenario 315 is created, it can be queried (e.g., "SELECT A, B, C FROM <scenario name>", etc.). In some cases, databases can have pre-defined calculation scenarios 315 (default, previously defined by users, etc.). The calculation scenarios 315 can be persisted in a repository (coupled to the database server) or in transient scenarios, the calculation scenarios 315 can be kept in-memory.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The calculation scenarios 315 of the calculation engine 320 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 320 to execute the calculation scenario 315 behind the calculation view. In some implementations, the calculation engine 320 and the SQL processor are calling each other: on one hand the calculation engine 320 invokes the SQL processor for executing set operations and SQL nodes and, on the other hand, the SQL processor invokes the calculation engine 320 when executing SQL queries with calculation views.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

Calculation scenarios as described herein can include a type of node referred to herein as a semantic node (or sometimes semantic root node). A database modeler can flag the root node (output) in a graphical calculation view to which the queries of the database applications directed as semantic node. This arrangement allows the calculation engine 320 to easily identify those queries and provide a proper handling of query in all cases.

One significant problem with hierarchies (i.e. a calculation model/scenario with calculation nodes performing hierarchical operations) is in connection with post-aggregation on top of hierarchy results. In particular, such problems can arise when there are unbalanced hierarchies include one or more leaf nodes that have multiple parents.

Figure 4:
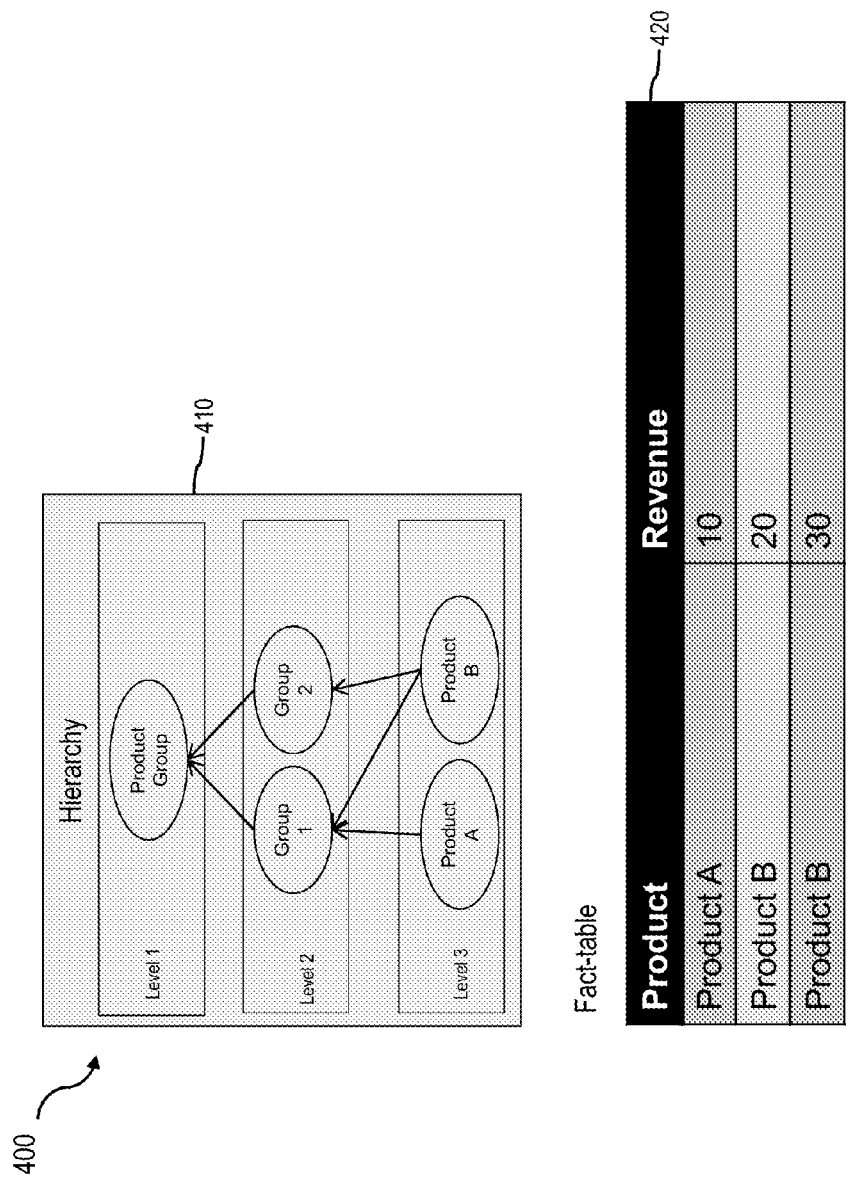
FIG. 4 is a diagram illustrating a hierarchy and a related fact table.
Figure 5:
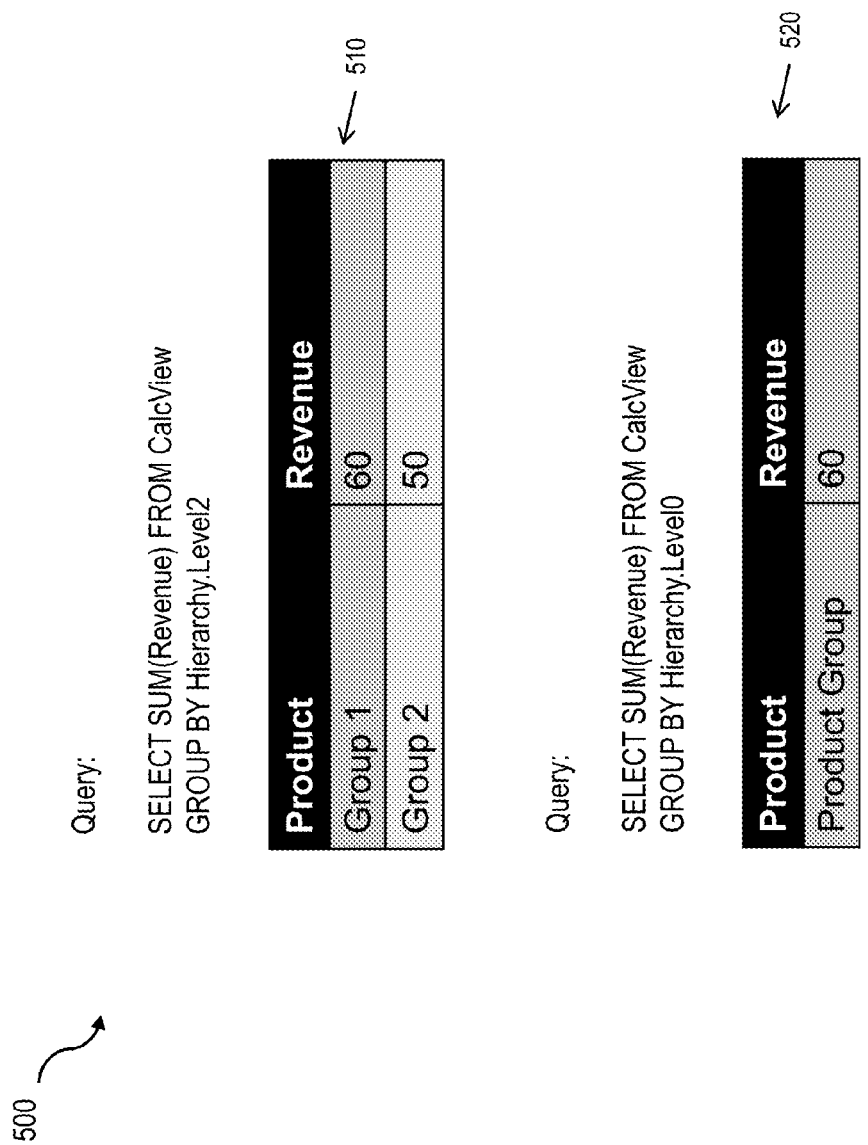
FIG. 5 are diagrams illustrating queries.

FIG. 4 is a diagram illustrating a hierarchy 410 and a corresponding fact table 420 on which the nodes of the hierarchy 410 perform their operations. The hierarchy 410 includes a product group at level 1, group 1 and group 2 at level 2, and product A and product B at level 3. Product B in this example includes two parents, namely both group 1 and group 2 at level 2. FIG. 5 illustrates queries 510, 520 specifies the operations to be performed by the hierarchy 410 of FIG. 4. The first query 510 illustrates how values for group 1 and group 2 can be calculated and the second query 520 illustrates how a value for the product group can be calculated. It will be appreciated from this example that multiplication of keyfigure values can occur if there is a post-aggregation on such a hierarchy.

Figure 6:
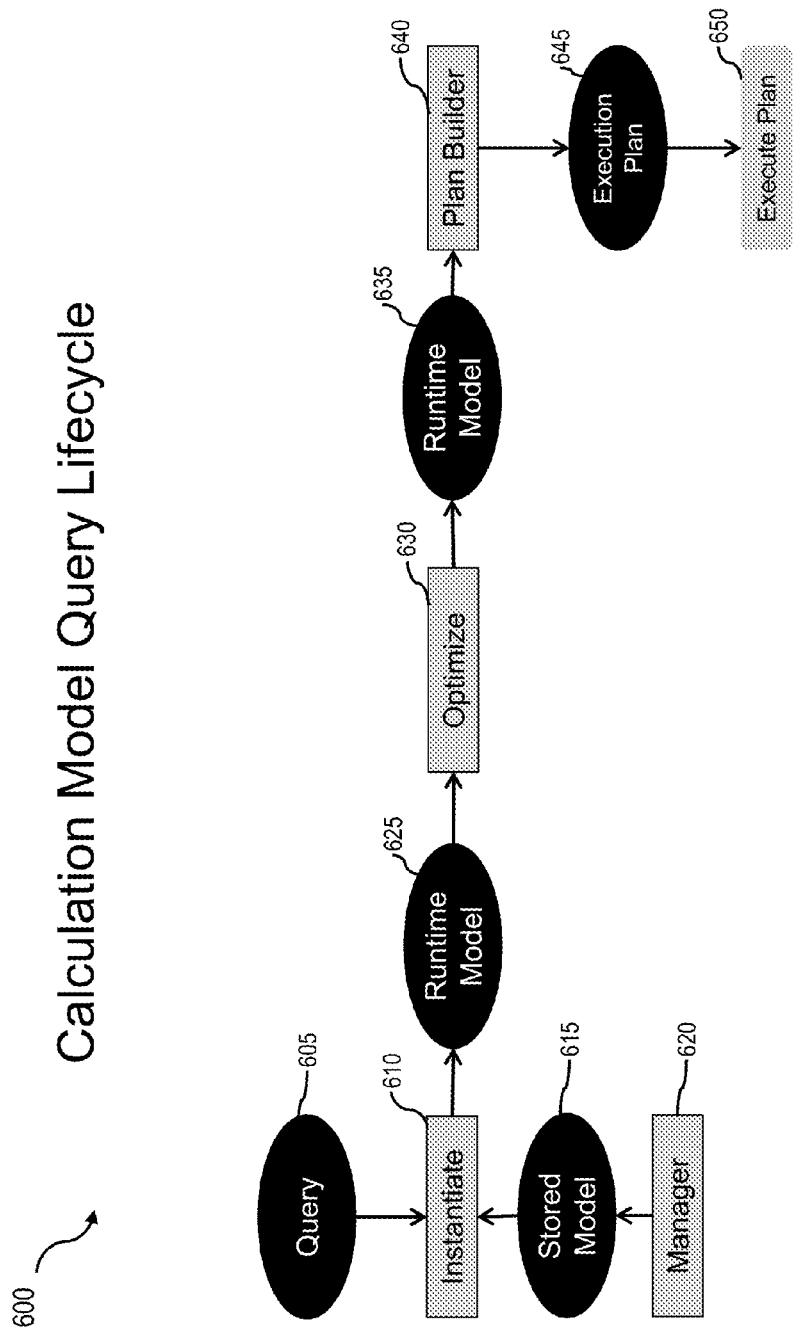
FIG. 6 is a diagram of a calculation model query lifecycle.

FIG. 6 is a diagram 600 illustrating how an execution plan of a calculation model can be written during instantiation of the calculation model. A query 605 can be received by a database server from a remote application. As part of an instantiation process 610, a model manager 620 associated with the calculation engine 320 can associate the query 605 with a stored calculation model 615 (see also calculation model 315 in FIG. 3). During the instantiation process 610, all information such as group by attributes, keyfigures, filters, and sorting, can be made available so that a subsequent execution plan can be correctly written to ensure that the expected behavior is implemented. In addition, the stored calculation model 615 can then be instantiated 610 to generate a runtime model 625. This runtime model 625 is subsequently optimized by the model optimizer 322 to result in an optimized runtime model 635.

Using this optimized runtime model 635, a plan builder 640 then generates a query execution plan 645 that specifies the operations to be performed by each calculation node of the optimized runtime model 635 as part of a subsequent execution of the plan 650.

Figure 7:
FIG. 7 is a diagram illustrating a query and different results when hierarchy view handling is performed outside of a calculation view.

FIG. 7 is a diagram 700 illustrating how an example for different results for a query when hierarchy view handling is performed outside of the calculation view. This diagram 700 illustrates that the result of a count distinct keyfigure differs.

Figure 8:
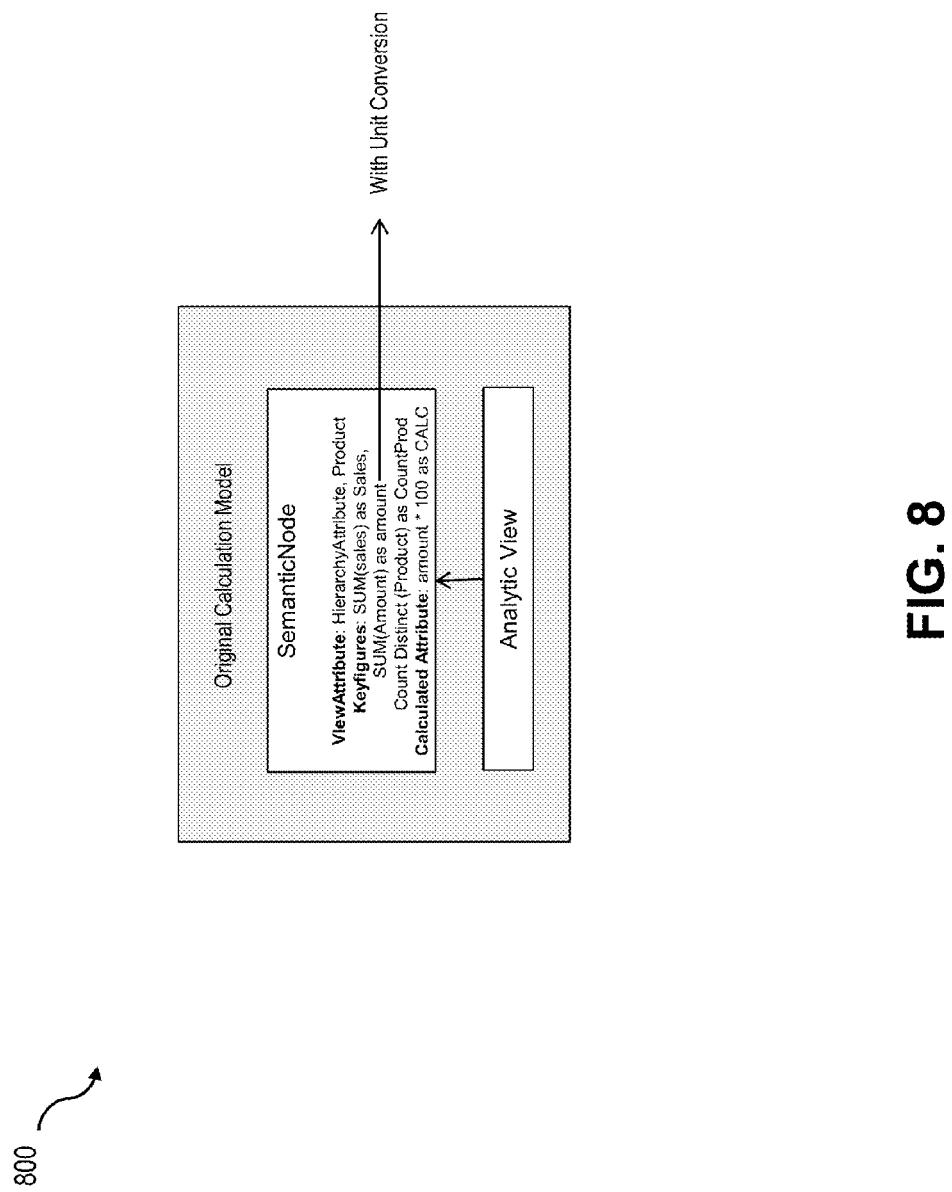
FIG. 8 is a first diagram illustrating rewrite of a query from an original calculation model.
Figure 9:
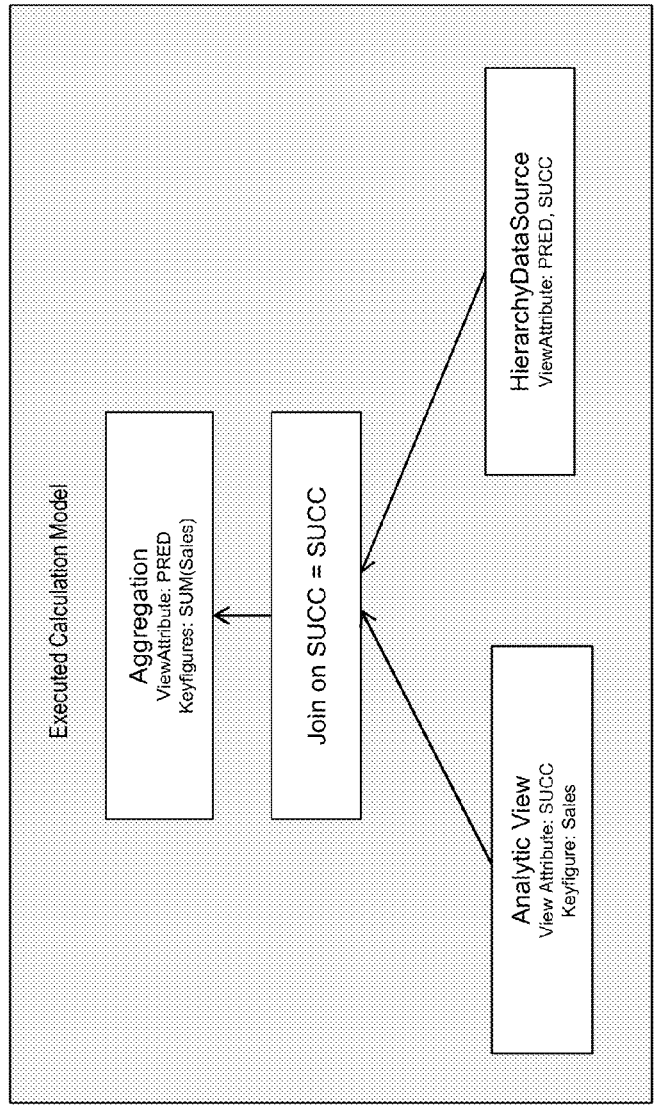
FIG. 9 is a second diagram illustrating rewrite of a query from an original calculation model.
Figure 10:
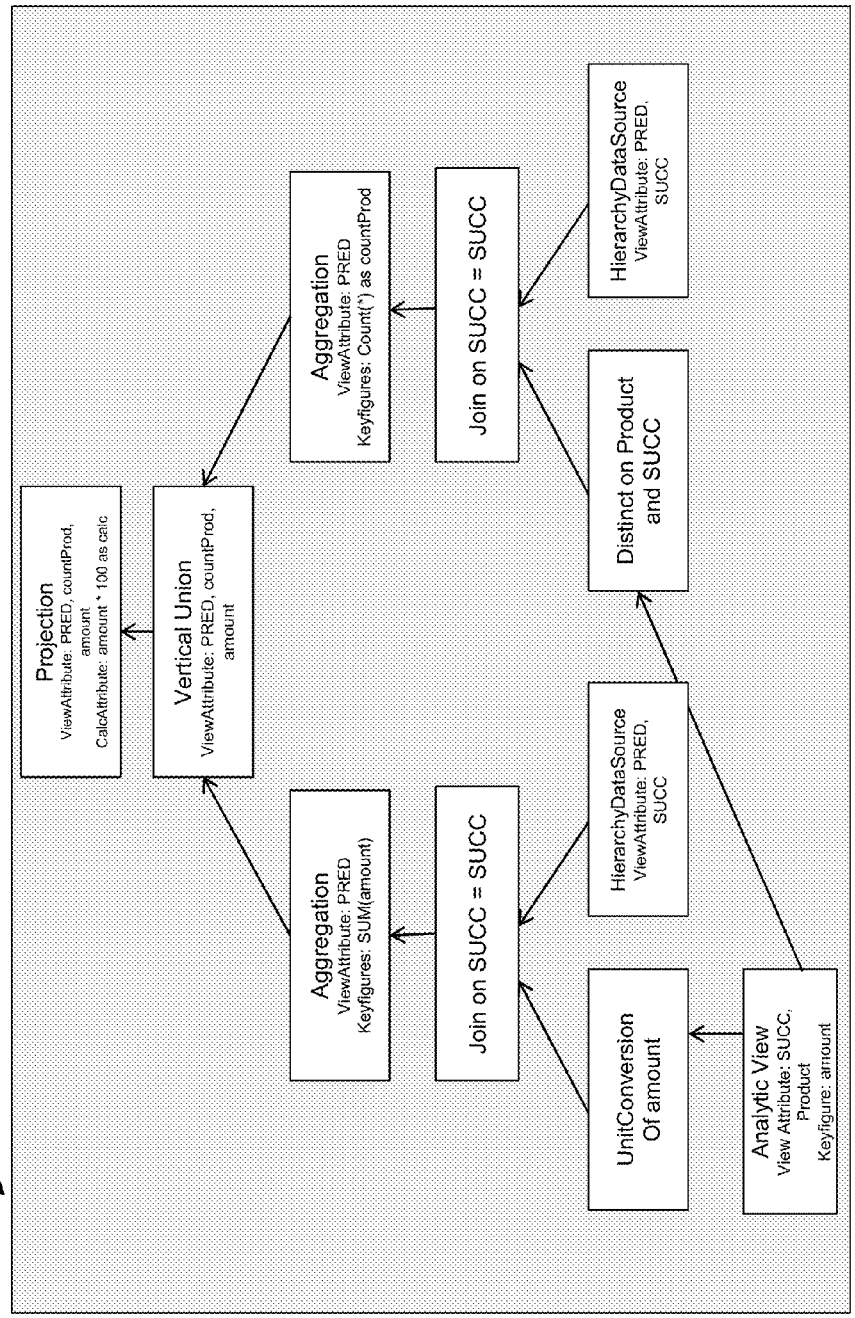
FIG. 10 is a third diagram illustrating rewrite of a query from an original calculation model.

FIGS. 8-10 are diagrams 800-1000 that illustrate rewrite of a query from an original calculation model 800 to an execution model 900, 1000 based on a specific query to result in an execution plan 1000. These diagrams illustrate how the execution plan highly differs from the original model and the complexity is also much higher. With this arrangement, the unit conversion operation must be performed before the join to hierarchy operation and the aggregation operation because the unit conversion operation requires additional columns (e.g. source unit-column, target unit-column, reference day column, etc.) for calculation. Therefore, the unit conversion operation should not be performed after the join to the hierarchy operation and the aggregation operation because then another aggregation operation needs to be performed after the unit conversion operation to get the group by level of the query.

In addition, count distinct is a two-step operation. First, a distinct operation needs to be performed on the distinct-columns (e.g. product in the example) and then the rows can be counted. In order to get the correct numbers for a count distinct operation, it must always be calculated independent from other key figures especially other count distinct key figures. Therefore, a new execution path can be added to achieve the independent calculation. The merge of the two independent paths can be done via a vertical union for performance reasons. Further, the merging can be a join on the group by columns but in patent "Calculating Count Distinct Using Vertical Unions" we proposed the vertical union approach.

Diagram 900 shows an expansion for hierarchy handling that is accomplished via a join before an aggregation. Diagram 1000 shows a more complex expansion that includes handling of unit conversion and the handling of count distinct keyfigures.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising: receiving, by a database server from a remote application server, a query associated with a calculation scenario that defines a data flow model that includes a plurality of calculation nodes, each calculation node defining one or more operations to execute on the database server, at least one of the nodes being a semantic node specifying an operation requiring special handling, at least one of the nodes being a leaf node having two or more parent nodes, the special handling comprising aggregating of results from the two or more parent nodes without redundant aggregation of results from the at least one leaf node; modifying, by the database server, the query using the semantic node to handle at least one hierarchy view within the calculation scenario, the at least one hierarchy view comprising a calculation model having a plurality of nodes arranged in a hierarchical manner, the plurality of nodes comprising a node having more than one parent node, the modifying the query comprising merging the paths between the semantic node and the at least one leaf node having two or more parent nodes, the merging followed by the aggregating of results from the two or more parent nodes; modifying, by the database server, the calculation scenario based on the modified query; instantiating, by the database server, the modified calculation scenario; executing, by the database server, the operations defined by the calculation nodes of the modified calculation scenario to result in at least one result set; and providing, by the database server to the application server, the at least one result set in response to the query.

2. The method of claim 1, wherein a hierarchy specified by the semantic node is used to aggregate data according to a selected hierarchy level.

3. The method of claim 1, wherein the received query specifies a unit conversion and operation and/or handling of count distinct key figures, wherein the special handling specified by the semantic node removes redundant operations.

4. The method of claim 1, wherein at least a portion of paths and/or attributes defined by the calculation scenario are not required to respond to the query, and wherein the instantiated calculation scenario omits the paths and attributes defined by the calculation scenario that are not required to respond to the query.

5. The method of claim 1, wherein at least one of the calculation nodes filters results obtained from the database server.

6. The method of claim 1, wherein at least one of the calculation nodes sorts results obtained from the database server.

7. The method of claim 1, wherein the calculation scenario is instantiated in a calculation engine layer by a calculation engine.

8. The method of claim 7, wherein the calculation engine layer interacts with a physical table pool and a logical layer, the physical table pool comprising physical tables containing data to be queried, and the logical layer defining a logical meta model joining at least a portion of the physical tables in the physical table pool.

9. The method of claim 1, wherein an input for each calculation node comprises one or more of: a physical index, a join index, an OLAP index, and another calculation node.

10. The method of claim 9, wherein each calculation node has at least one output table that is used to generate the final result set.

11. The method of claim 10, wherein at least one calculation node consumes an output table of another calculation node.

12. The method of claim 1, wherein the executing comprises: forwarding the query to a calculation node in the calculation scenario that is identified as a default node if the query does not specify a calculation node at which the query should be executed.

13. The method of claim 1, wherein the query identifies a particular calculation node, and wherein the executing comprises: forwarding the query to the calculation node specified in the query at which the query should be executed.

14. The method of claim 1, wherein the calculation scenario comprises database metadata.

15. The method of claim 1, wherein the calculation scenario is exposed as a database calculation view.

16. The method of claim 15, wherein the executing comprises: invoking, by a SQL processor, a calculation engine to execute the calculation scenario behind the database calculation view.

17. The method of claim 16, wherein the calculation engine invokes the SQL processor for executing set operations.

18. The method of claim 17, wherein the SQL processor invokes the calculation engine when executing SQL queries with calculation views.

19. A non-transitory computer program product storing instructions, which when executed by at least one data processor, result in operations comprising: receiving a query associated with a calculation scenario that defines a data flow model that includes a plurality of calculation nodes, each calculation node defining one or more operations to execute on the database server, at least one of the nodes being a semantic node specifying an operation requiring special handling, at least one of the nodes being a leaf node having two or more parent nodes, the special handling comprising aggregating results from the two or more parent nodes without redundant aggregation of results from the at least one leaf node; modifying the query using the semantic node to handle at least one hierarchy view within the calculation scenario, the at least one hierarchy view comprising a calculation model having a plurality of nodes arranged in a hierarchical manner, the plurality of nodes comprising a node having more than one parent node, the modifying the query comprising merging the paths between the semantic node and the at least one leaf node having two or more parent nodes, the merging followed by the aggregating of results from the two or more parent nodes; modifying the calculation scenario based on the modified query; instantiating the modified calculation scenario; executing the operations defined by the calculation nodes of the modified calculation scenario to result in at least one result set; and providing the at least one result set in response to the query.

20. A system comprising: a database server; and an application server remote from the database server; wherein the database server: receives a query associated with a calculation scenario that defines a data flow model that includes a plurality of calculation nodes, each calculation node defining one or more operations to execute on the database server, at least one of the nodes being a semantic node specifying an operation requiring special handling, at least one of the nodes being a leaf node having two or more parent nodes, the special handling comprising aggregating results from the two or more parent nodes without redundant aggregation of results from the at least one leaf node; modifies the query using the semantic node to handle at least one hierarchy view within the calculation scenario, the at least one hierarchy view comprising a calculation model having a plurality of nodes arranged in a hierarchical manner, the plurality of nodes comprising a node having more than one parent node, the modifies the query comprising merging the paths between the semantic node and the at least one leaf node having two or more parent nodes, the merging followed by the aggregating of results from the two or more parent nodes; modifies the calculation scenario based on the modified query; instantiates the modified calculation scenario; executes the operations defined by the calculation nodes of the modified calculation scenario to result in at least one result set; and provides the at least one result set in response to the query.

21. The method of claim 1, wherein the modifying the query further comprises converting units of a value of at least one of the nodes before the merging of the paths.

22. The method of claim 1, wherein the merging of the paths comprises at least one of a union operation and a join operation.

* * * * *